United States Patent
Son et al.

(10) Patent No.: US 6,990,064 B2
(45) Date of Patent: Jan. 24, 2006

(54) PACKET PROCESSING METHOD USING MULTIPLE FAULT TOLERANT NETWORK STRUCTURE

(75) Inventors: Dong Hwan Son, Jinhae (KR); Young Sik Baek, Daejon (KR); Eun Ro Kim, Jinhae (KR); Dae Yeon Kim, Changwon (KR); Ho Sung Koo, Suwon (KR); Byung Hi Kim, Daejon (KR)

(73) Assignee: Agency for Defense Development, Daejon (KR)

(*) Notice: Subject to any disclaimer, the term of this patent is extended or adjusted under 35 U.S.C. 154(b) by 912 days.

(21) Appl. No.: 09/921,784

(22) Filed: Aug. 3, 2001

(65) Prior Publication Data
US 2002/0027877 A1 Mar. 7, 2002

(30) Foreign Application Priority Data
Sep. 2, 2000 (KR) .............................. 2000-051882

(51) Int. Cl.
*H04J 1/16* (2006.01)
*H04J 3/14* (2006.01)

(52) U.S. Cl. ..................................... 370/221; 370/222

(58) Field of Classification Search ................ 370/216, 370/222, 223, 224, 225, 226, 227, 228, 221; 714/100, 1, 2, 4
See application file for complete search history.

(56) References Cited

U.S. PATENT DOCUMENTS

| | | | | |
|---|---|---|---|---|
| 4,388,683 A | * | 6/1983 | Beifuss et al. | 710/106 |
| 4,837,856 A | * | 6/1989 | Glista, Jr. | 398/6 |
| 5,544,151 A | | 8/1996 | Baek et al. | |
| 6,324,162 B1 | * | 11/2001 | Chaudhuri | 370/225 |
| 6,643,464 B1 | * | 11/2003 | Roorda et al. | 398/59 |
| 6,728,205 B1 | * | 4/2004 | Finn et al. | 370/217 |
| 6,848,006 B1 | * | 1/2005 | Hermann | 709/239 |

FOREIGN PATENT DOCUMENTS

JP 60169255 9/1985
KR 123064 9/1997

* cited by examiner

Primary Examiner—Ajit Patel
(74) Attorney, Agent, or Firm—Scully Scott Murphy & Presser

(57) ABSTRACT

A packet processing method using a multiple fault tolerant network structure capable of performing communication of a whole ring and disusing a useless packet when a fault occurs on a plurality of connection lines and nodes by using a dual ring structure. Nodes are connected as a ring shape separately having two input lines and two output lines, and each node selects one packet after receiving two inputs and disuses the other packet and transmits the select packet through the two output lines at the same time. The present invention can solve the fault problem occurred on a multiple link or nodes, can perform network function efficiently by disusing a useless packet, accordingly it is possible to perform stable operation for several years or several decades after the network installation and decrease maintenance expenses.

5 Claims, 8 Drawing Sheets

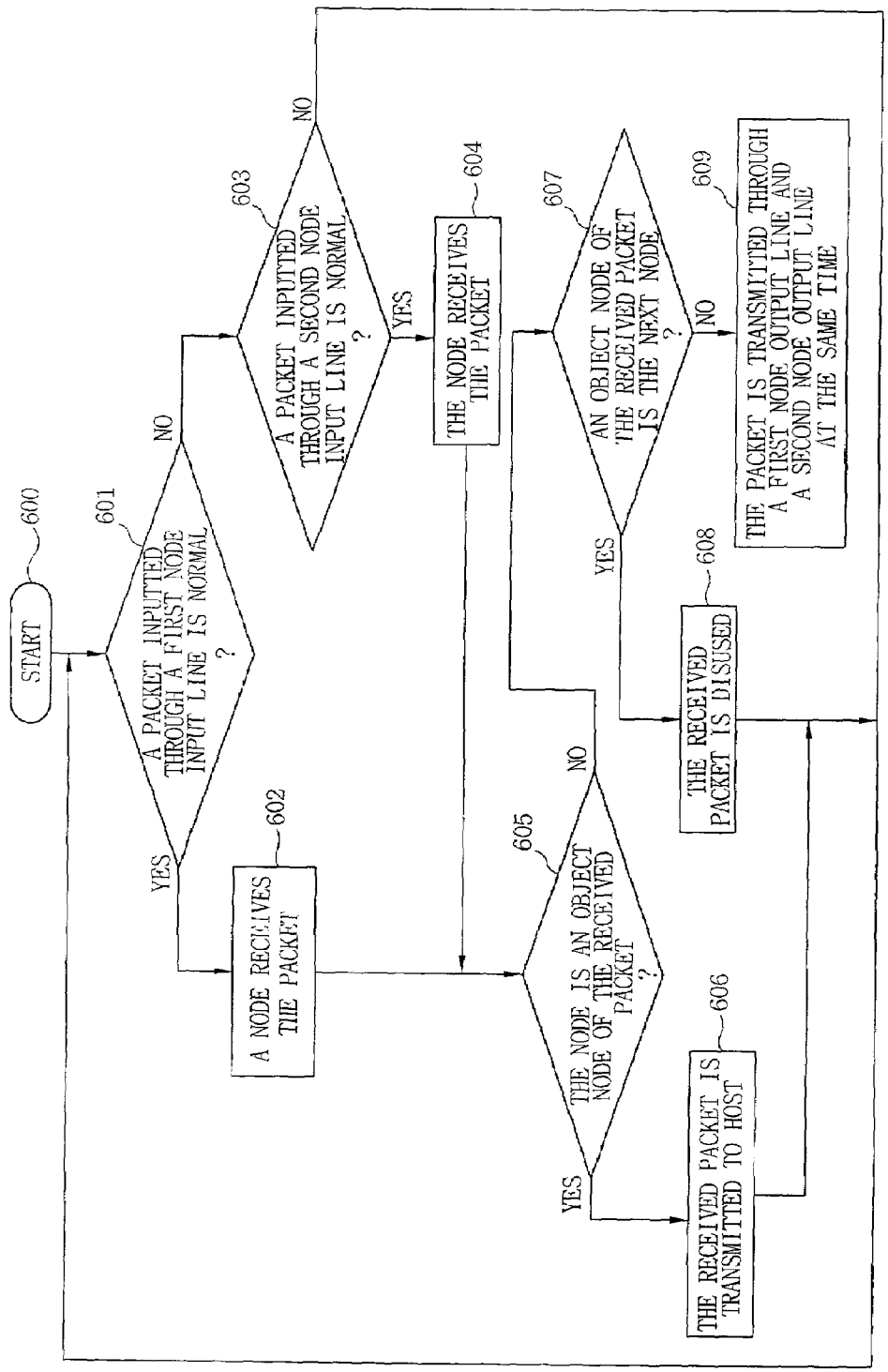

PACKET PROCESSING METHOD USING MULTIPLE FAULT TOLERANT NETWORK STRUCTURE

BACKGROUND OF THE INVENTION

1. Field of the Invention

The present invention relates to a packet processing method using a multiple fault tolerant network structure, in particular to a packet processing method using a multiple fault tolerant network structure which is capable of performing communication of a whole ring and disusing a useless packet when a fault occurs on a plurality of connection lines and nodes by using a dual ring structure.

2. Description of the Prior Art

In general, a large scale system is constructed as modules by functions, and a connection network is used in order to connect the each module. When a fault occurs on the connection network, the system can not perform normal operation. For example, a distribution system constructed with connected computers may not operate normally due to the fault.

Among network structures for overcoming the fault problem of the connection network, a ring structure can efficiently connect scattered nodes with minimum connection lines on the comparison with connection lines of a star network and a mesh network.

However, in the ring structure, when the fault occurs on the one node or one connection line, the communication between the all nodes is disconnected. Accordingly, in order to prevent it a dual connection network is used in a system required a high credibility.

FIGS. 1a and 2a illustrate the conventional dual ring structure, the dual ring of FIG. 1a connects the each node 10, 11, 12, 13 to a different direction each other, the dual ring of FIG. 2a connects the each node 20, 21, 22, 23 to the same direction. In other words, FIGS. 1a and 2a illustrate the structure of the conventional duplicated FDDI (Fiber Distributed Data Interface) connection network, the FDDI is constructed with the duplicated connection network, when the fault occurs on a certain node, the rest of the nodes are reconstructed with single connection network, accordingly the nodes which doesn't have the fault occurrence can perform communication normally.

FIG. 1a illustrates a ring structure which prevents the communication cut off between the nodes when the fault occurs on the one node or the one connection line by constructing the rest of the nodes as a single ring. FIG. 1b illustrates the delayed state of the dual ring structure of FIG. 1a in the fault occurrence, in more detail when the fault occurs on a node 3 12, the node 3 12 forms a single ring by detouring a packet to each connection line b1, b2 in order to perform the communication continually. However, when the conventional dual ring is reconstructed as the single ring due to the fault occurrence and a fault occurs again on the other node or connection line, the overall system can not operate normally.

FIGS. 2a and 2c are represented in order to solve the above-mentioned problem. In FIG. 2a, the each node selects one good signal between two inputs, and it transmits the input as two outputs at the same time when its node is not an object node in order to make the communication perform when the fault occurs a plurality of the connection lines or even the fault occurs on the one connection line of the each node. In FIG. 2a, when the fault occurs on a connection line L1, a connection line L2 makes the communication possible.

FIG. 2c illustrates communication system represented in the Japan patent official bulletin No. 60-169255 (Patent date. Sep. 2, 1985), the each node receives same two inputs, transmits same two outputs, when the fault occurs on the one connection line, the node does not receive a packet from the fault occurred connection line, but receives a packet from the other connection line. In other words, in FIG. 2d, when the fault occurs on the connection line L1, a node 21 receives an input packet of a reception line R' on the behalf of a reception line R, accordingly the communication is possible. However, as depicted in FIGS. 2b and 2e, when the fault occurs on the more than one node, the overall communication is cut off.

FIG. 3a is a construction profile illustrating the conventional dual ring cross path, the conventional technology related to it is represented in the Korea patent No. 0123064 (Patent Registration Date Sep. 10, 1997). In the dual ring cross path, two duplication transmission/reception interface devices 30, 31 pass through each connection line, 4 packets are transferred between nodes through 4 paths in order to make the one packet arrive the final object node. Herein, when the fault occurs on two D-nodes (for example, 302 and 312), the communication is cut off due to an island occurrence.

FIG. 3b illustrates a high speed data transmission represented in the U.S. Pat. No. 4,837,856 (Patent Registration Date. Jun. 6, 1989) and a fault tolerance fiber optic sense connection line/tandem line for being used in a similar field. In the patent, the signal transmission is performed by comprising a primary line and at least one bypass line, analyzing signals from the lines, comparing them with a preset value, and selecting one among them. In the patent, when the packet is transmitted from a node 351 to a node 354, the packet starts from the node 351 and is received to the node 353, the node 353 transmits the packet to the node 354 and 355. When the fault occurs on a connection line L1, the node 355 receives the packet to be disused from the node 353, the packet is outputted to the connection line L3, L4, the useless packet continually uses the ring, accordingly it causes the communication difficulty.

SUMMARY OF THE INVENTION

The object of the present invention is to provide a packet processing method using a multiple fault tolerant network structure which is capable of making a ring operation possible when a fault occurs on a multiple cable or multiple nodes, accordingly the present invention can decrease maintenance expenses for several years or several decades after a network installment by disusing a packet efficiently or transmitting it after selecting.

BRIEF DESCRIPTION OF THE DRAWINGS

FIG. 1b is a construction profile illustrating a delayed state in a fault occurrence on the dual ring of FIG. 1a.

FIG. 2b is a construction profile illustrating a delayed state in the fault occurrence on the dual ring of FIG. 2a.

FIG. 6 is a flow chart illustrating a packet processing method using the multiple fault tolerant network structure of FIG. 4*a* according to the present invention.

DETAILED DESCRIPTION OF THE PREFERRED EMBODIMENT

The present invention relates to a multiple fault tolerant network structure. In the packet processing method using the multiple fault tolerant network structure including nodes connected as a ring shape separately having two input lines and two output lines, wherein the one output line of the node is connected to an input line of an adjacent node, the other output line of the node is connected to an input line of a node next to the adjacent node, the each node selects one packet after receiving two inputs and disuses the other packet and transmits the select packet through the two output lines at the same time, the packet processing method using the multiple fault tolerant network structure according to the present invention comprises a first step for receiving the packet through the input line operating normally after checking the input lines, a second step for transmitting the packet to a host when the node is an object node of the received packet, a third step for disusing the received packet when the object node of the received packet is a node adjacent to the node after checking it whether the adjacent node is the object node of the received packet, and a fourth step for transmitting the two duplicated packets through the output lines when the object node of the received packet is not the adjacent node.

Figure 1A:
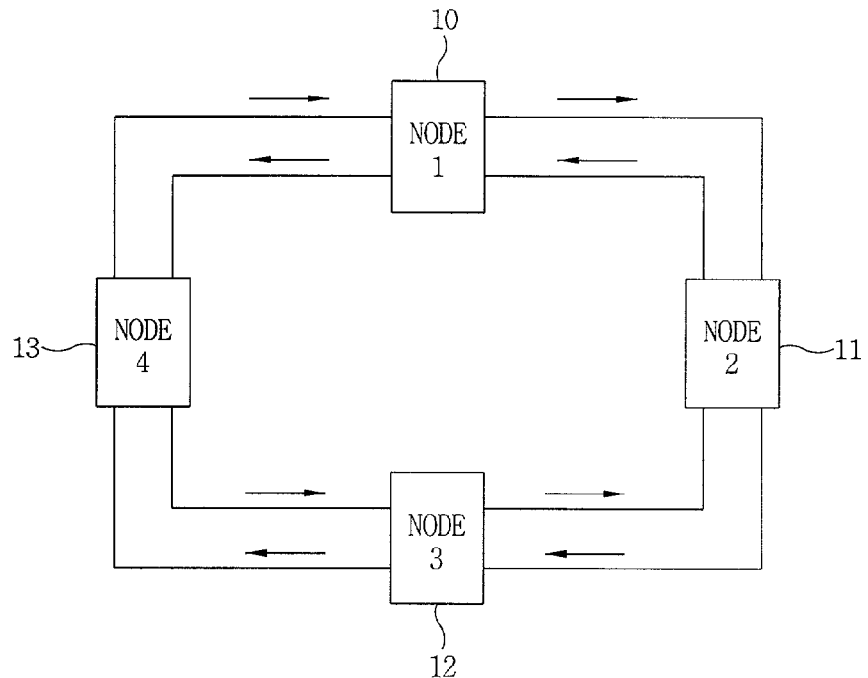
FIG. 1a is a construction profile illustrating the conventional dual ring structure connecting nodes to the different direction each other.
Figure 1B:
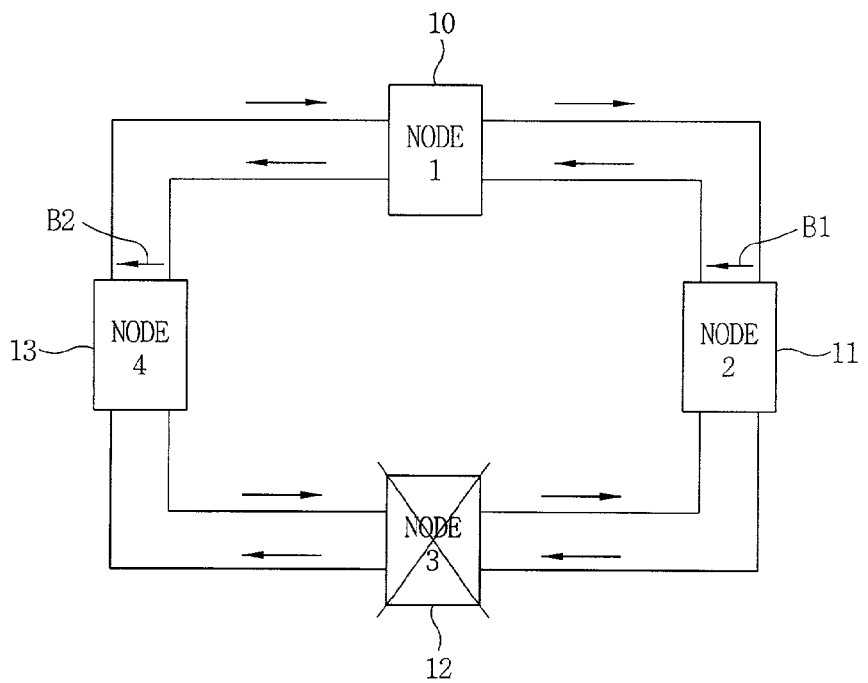
Figure 2A:
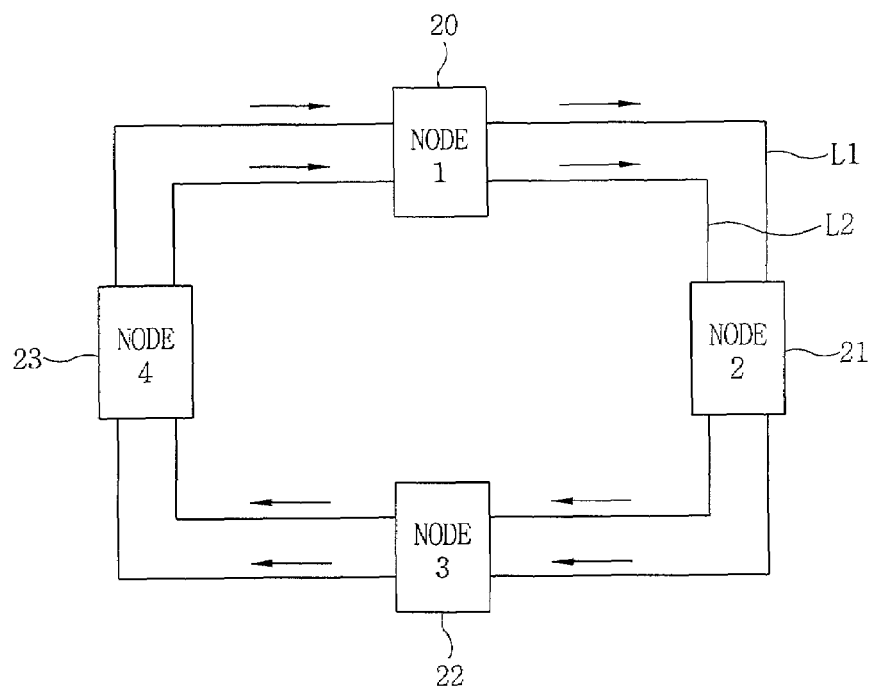
FIG. 2a is a construction profile illustrating the conventional dual ring structure connecting nodes to the same direction each other.
Figure 2B:
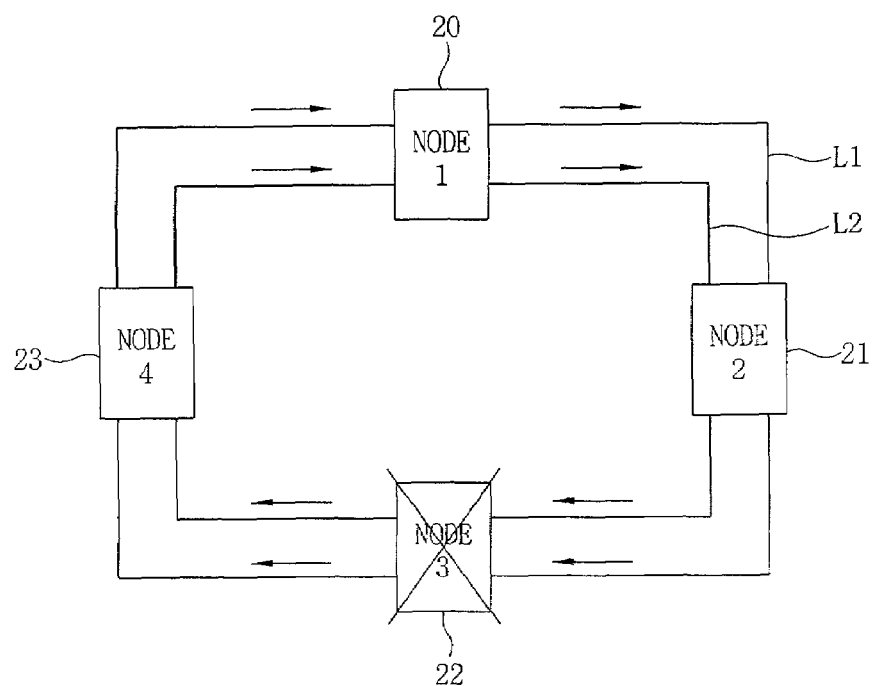
Figure 2C:
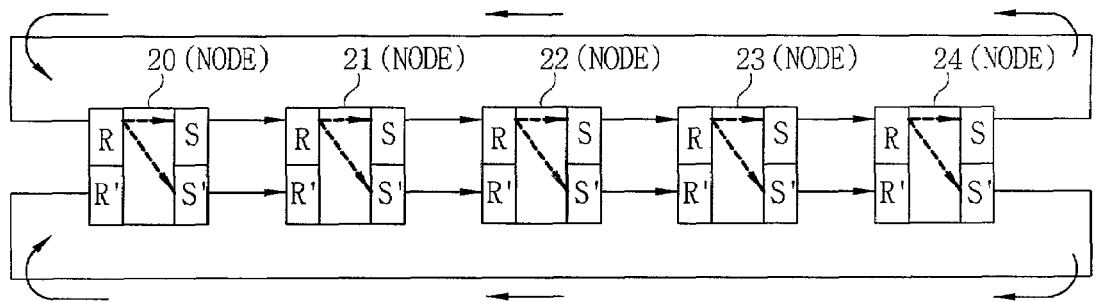
FIG. 2c is a construction profile illustrating the conventional dual loop communication system.
Figure 2D:
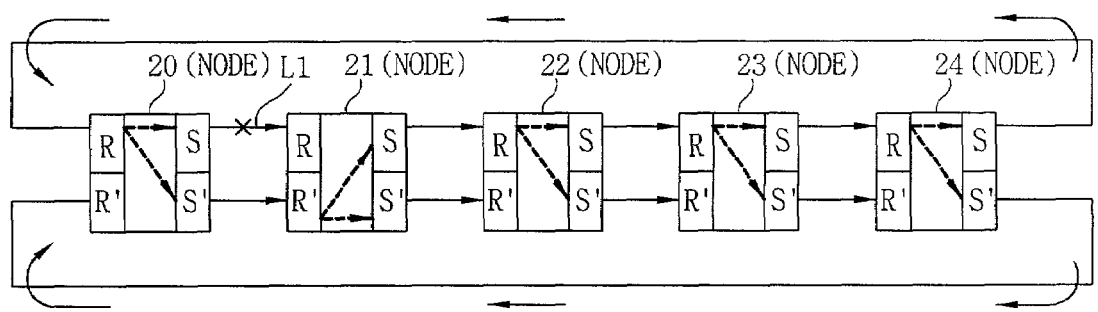
FIG. 2*d* is a construction profile illustrating the delayed state in the fault occurrence on a connection line of the dual loop of FIG. 2*c*.
Figure 2E:
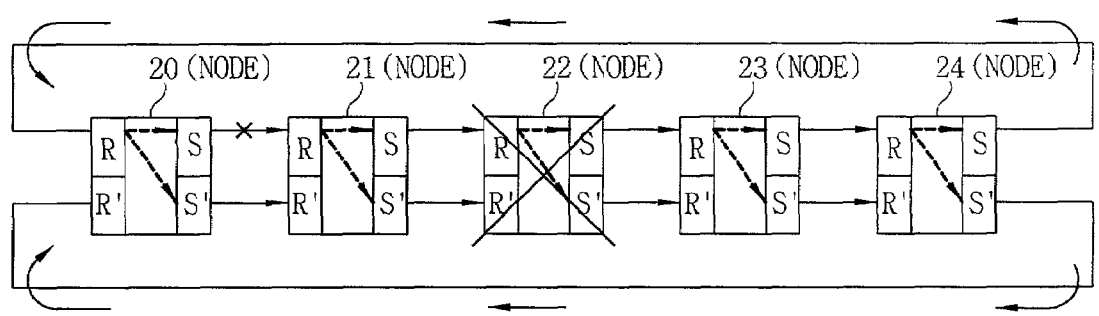
FIG. 2*e* is a construction profile illustrating the delayed state in the fault occurrence on a node of the dual loop of FIG. 2*c*.
Figure 3A:
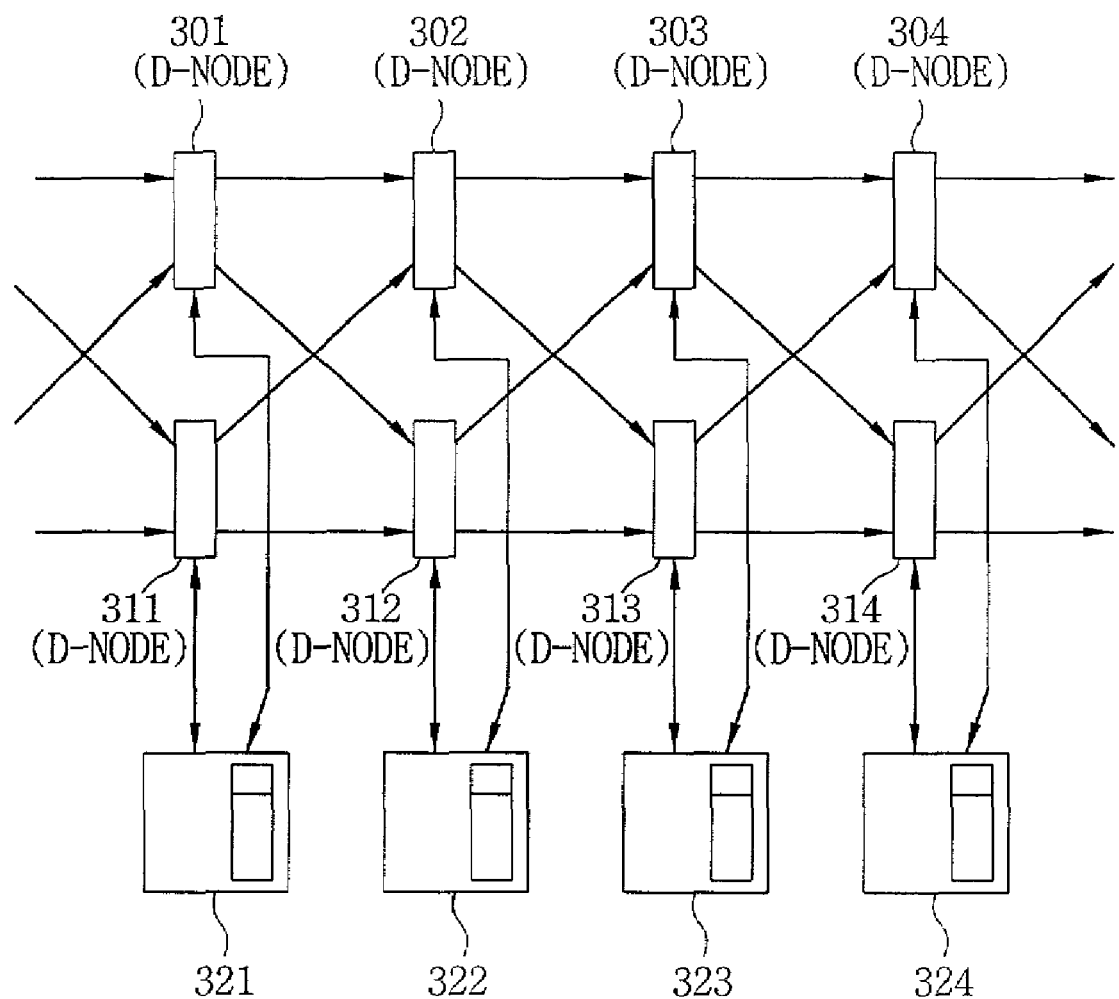
FIG. 3*a* is a construction profile illustrating the conventional dual ring cross path.
Figure 3B:
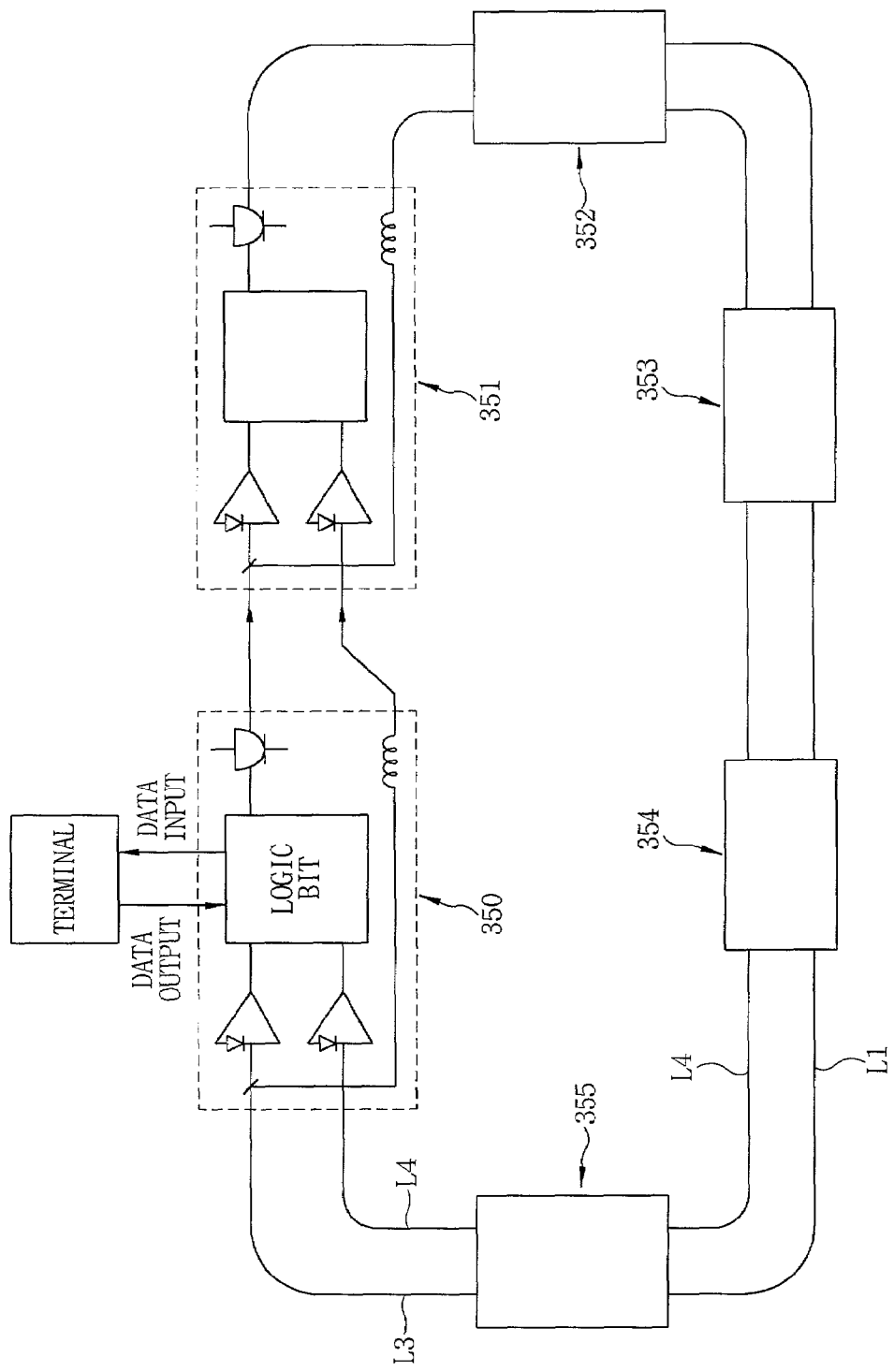
FIG. 3*b* is a construction profile illustrating the conventional fault-tolerant connection line/relay line.
Figure 4A:
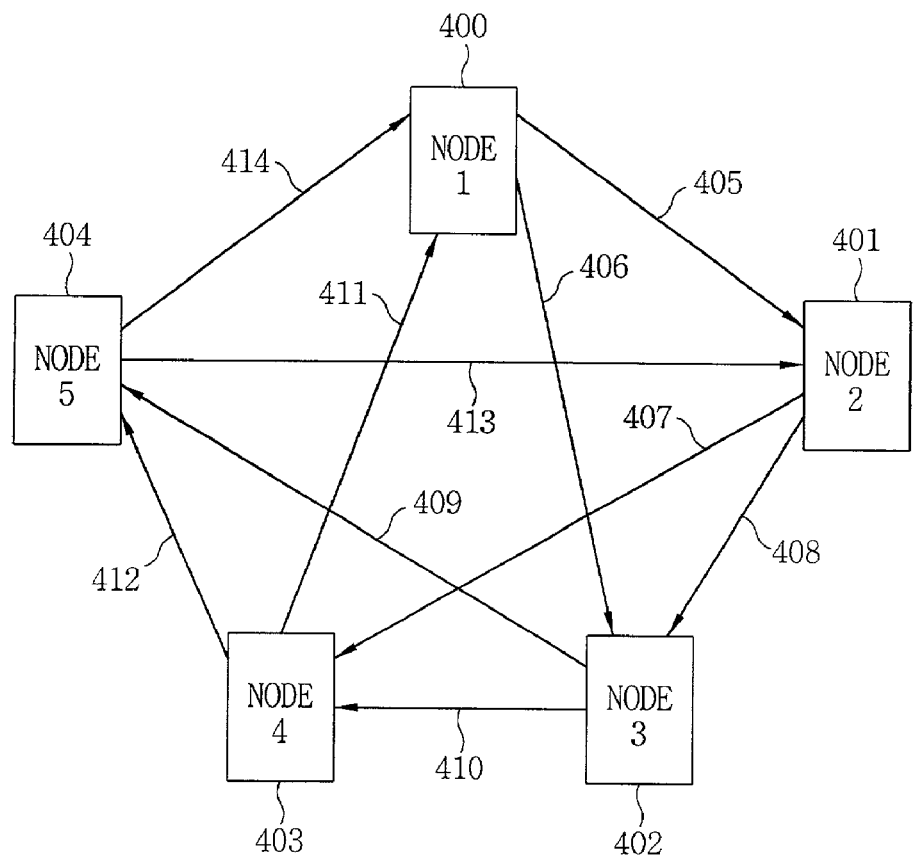
FIG. 4*a* is a construction profile illustrating a multiple fault tolerant network in accordance with the present invention.

FIG. 4*a* illustrates the multiple fault tolerant network structure according to the present invention, a node 1 400 comprises two input lines 414, 411 and two output lines 405, 406. The output line 405 is connected to an input line of an adjacent node 2 401. A node 2 401, a node 3 402, a node 4 403 and a node 5 404 have the same connection structure with the node 1 400.

Figure 4B:
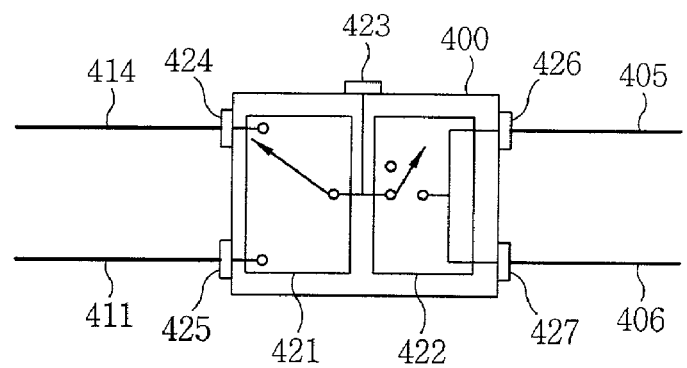
FIG. 4*b* is a construction profile illustrating the node of FIG. 4*a* according to the present invention.

FIG. 4*b* is a construction profile illustrating the node FIG. 4*a*. The each node comprises a first node input line and a second node input line for receiving the packet, input ports for inputting the packet from the each input line to the node, a first node output line and a second node output line for outputting the packet from the node to adjacent nodes, output ports for outputting the packet from the each output line, a packet select mean for selecting one packet among the packets inputted from the input ports, a host connection port for transmitting the packet of the node to a host computer, and a packet judgment mean for transmitting the selected packet to the output ports when the node is not the object node of the selected packet.

For example, the node 1 400 comprises two input ports 424, 425 connected to the input lines 414, 411 of the node 1 400 in order to receive the packet, a packet select mean 421 for selecting the one packet among the packets received from the input ports 424, 425, a packet judgement mean 422 for judging the object node of the packet selected by the packet select mean 421, a host connection port 423 for transmitting the packet received from the packet judgement mean to the host, and output ports 426, 427 for transmitting the packet received from the packet judgement mean 422 to the two output lines 405, 406. The node 2 401, node 3 402, node 4 403 and node 5 404 have the same construction with the node 1 400. The all nodes in the construction can be an object node in accordance with the object node of the packet.

In the other example, the node 1 400 is constructed with a host connection port, the node 2 401~node 5 404 is constructed only with a function processing port, the host computer (not shown) connected to the host connection port receives data from the node 2 401~node 5 404 and transmits a control signal to the node 2 401~node 5 404, a function processing line (not shown) connected to the function processing port receives the control signal, and the node 2 401~node 5 404 transmits the received data. In the construction, the node 1 400 can be the object node when the data is received from the node 2 401~node 5 404 and is transmitted to the host computer, and the node 2 401~node 5 404 can be the object node by being inputted the control signal node when the control signal is transmitted to a certain node of the host computer.

The node 1 400 receives the first reception packet through the input line 414 from the adjacent node 5 404, and it receives the second reception packet through the input line 411 from the node 4 403 adjacent to the node 5 404. The received first reception packet and second reception packet are separately inputted to the packet select mean 421 through the input port 424, 425. The packet select mean 421 selects the normal operation packet (hereinafter, it is referred to a select packet) between the first reception packet and second reception packet and transmits it to the packet judgment means 422.

There is methods for determining the select packet between the received packets.

In the one method, when the fault occurs on the input line, in other words, when the packet does not exist within a certain time (time for at least 1 set packet arrival) designated by a network design parameter (for example, packet transmission speed ect.) due to the cut off of the input line, the input line is judged as an abnormal, and the packet select mean does not select the packet inputted through the abnormal input line.

In the other method, when the fault occurs on a certain node, as same as the fault judgement on the input line, the packet from the certain node is judged as the abnormal packet when the packet does not arrive within a certain time.

And, in the another method, the packet select mean does not select the packet from a certain node when the abnormal construction of the packet is judged by extracting the structure of the packet or a head value of the certain node can not be checked by comparing and judging it with a reference packet form and a reference packet value.

Generally, the packet has a normalized form structure (for example, ATM cell 1), the each node has an initial recognition number, namely, a head. When the object node of the select packet is the node 1 400, the packet judgment means 422 transmits the select packet to the host connection port 423, when the object node of the select packet is not the node 1 400, the packet judgment means 422 transmits the select packet to the output ports 426, 427, and the select packet is transmitted to the adjacent node 2 401 and node 3 402 through the output lines 405, 406.

Figure 5A:
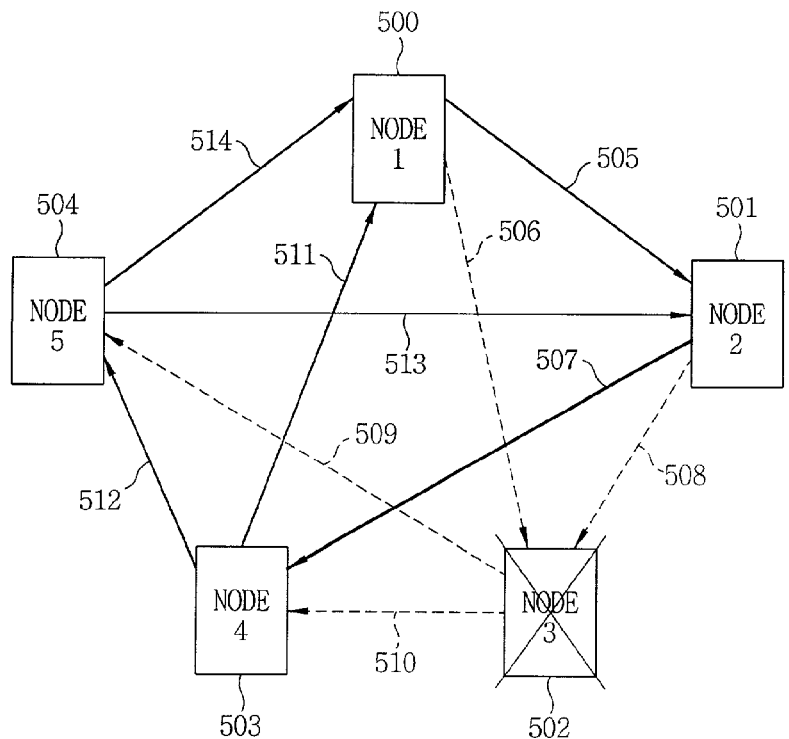
FIG. 5*a* is a construction profile illustrating the delayed state in the fault occurrence on the one node described in FIG. 4*a* according to the present invention.
Figure 5B:
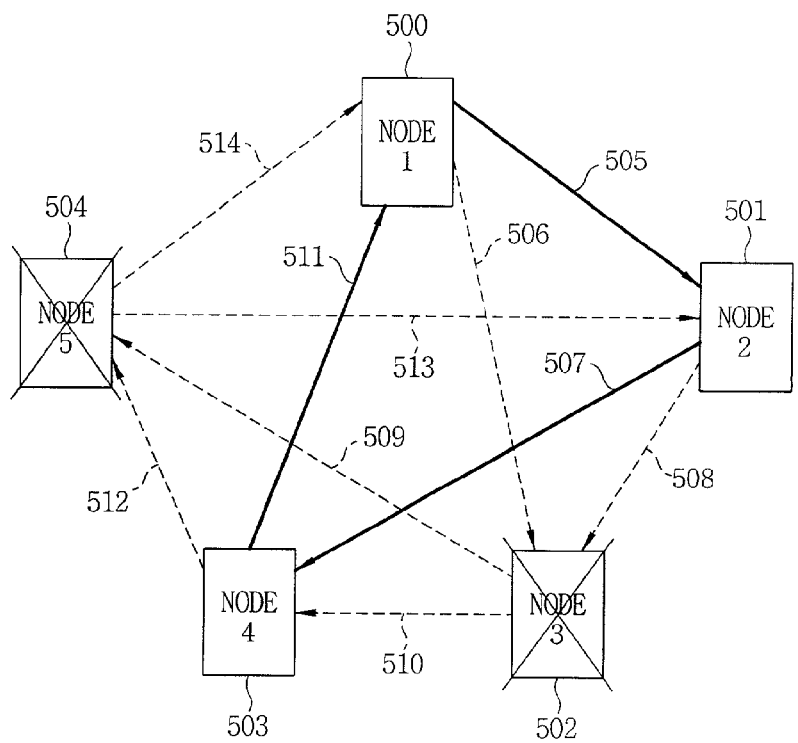
FIG. 5*b* is a construction profile illustrating the delayed state in the fault occurrence on the two nodes described in FIG. 4*a* according to the present invention.

FIGS. 5a and 5b illustrate the fault occurrence on the multiple fault tolerant structure of FIG. 4a.

FIG. 5a illustrates the fault occurrence on the node 3 502, the node 4 503 detects the fault on the input line 510, and receives the packet through the input line 507. Accordingly, the packet is transmitted from the node 2 501 to the node 4 503 through the input line 507, the communication between the node 1 500, node 2 501, node 4 503 and node 5 504 is performed normally. FIG. 5b illustrates the fault occurrence on the node 5 504, the node 1 500 detects the fault occurrence on the input line 514, and receives the packet through the input line 511. Accordingly, the communication between the node 1 500, node 2 501, node 4 503 is performed normally.

FIG. 6 is a flow chart illustrating the packet processing method using the multiple fault tolerant network structure of FIG. 4a. In other words, in the present invention, because the output line of the node is connected to not only the adjacent node but also the node next to the adjacent node, besides a checking step for checking whether the object node of the select packet is the node receiving the packet, a checking step for checking whether the packet is to be disused after circuiting already the multiple fault tolerant network one time.

In more detail, when the packet is inputted to the node, the packet processing method according to the flow chart of FIG. 6 starts S600, it is judged whether the packet of the first node input line is normal S601, when the packet of the first node input line is normal S603, the packet from the first node input line is received S602, it is judged whether the packet of the second node input line is normal when the packet of the first node input line is not normal, when the packet of the second node input line is normal, the packet from the second node input line is received S604, when the packet of the second node input line is not normal, it waits until a new packet is inputted, it is judged whether the object node of the packet received from the first node input line or second node input line is the node receiving the packet S605, the received packet is transmitted to the host computer connected to the node when the object node of the packet is the node receiving the packet S606, it is judged whether the object node of the packet is the adjacent node next to the node receiving the packet when the object node of the packet is not the node receiving the packet S607, the packet is disused S608 when the object node of the packet is the node next to the node receiving the packet S608, when the object node of the packet is not the node next to the node, the packet is transmitted to the next nodes through the first node output line and second node output line S609.

For example, as depicted in FIG. 4a, when the packet is transmitted from the node 2 401 to the node 5 404, the packet starts from the node 2 401 and is received to the node 4 403, the node 4 403 transmits the packet to the node 5 404 and node 1 400.

When the fault occurs on the input line 414, the node 1 400 receives the packet to be disused from the node 4 403. When the packet is outputted again through the output lines 405, 406, the useless packet continually uses the ring, accordingly the communication can not be performed normally.

The node 1 400 of FIG. 4b checks the packet received through the input line 414, 411 with the packet select mean, when the packet inputted to the input line 414 is normal S601, the packet is received S602. When the packet is not the normal, the packet received to the input line 411 is checked S 603. When the packet is normal, the packet is received S604. The object node of the select packet is checked S605, when the node 1 400 is the object node, the select packet is transmitted to the host computer through the host connect port 423 of the node 1 400 S606. When the node 1 400 is not the object node, it is checked whether the object node is the node 5 404 adjacent to the node 1 400 S607. When the object node is the node 5 404 adjacent to it, the select packet (411) is disused S608. When the object node is not the adjacent node 5 404, the select packet (411) is doubly transmitted through the output lines 405, 406 S609.

In the conventional technology, the communication can be performed in multiple cable fault, but can not be performed in even one node fault. However, the present invention can perform the normal operation of a whole system when the multiple faults occur on the cable or node, and can disuse the useless packet occurred on the system. And, the present invention can decrease the maintenance expenses by operating stably for several years or several decades after the network installation.

What is claimed is:

1. A packet processing method using a multiple fault tolerant network structure including nodes connected as a ring shape having two input lines and two output lines, wherein a first output line of the two output lines of each node is connected to an input line of an adjacent node, another output line of the two output lines of each node is connected to an input line of a node next to the adjacent node, each node selects a received packet after receiving two packets, and disuses another received packet of the two received packets, the method comprising:

receiving the packet through a first input line operating normally after checking the input lines:

transmitting the packet to a host associated with the node, when the node is an object node of the received packet;

disusing the packet when the object node of the received packet is the adjacent node, after checking the packet to determine whether the adjacent node is the object node of the packet; and transmitting duplicated packets through the two output lines, when the object node of the received packet is not the adjacent node.

2. The packet processing method according to claim 1, wherein the receiving process checks the first input line connected to an adjacent transmitting node, and then checks the other input line connected to a node next to the adjacent transmitting node when a functioning of the input line connected to the adjacent transmitting node is not normal.

3. The packet processing method according to claim 1, wherein the node comprises:

two input ports connected to the input lines;

packet select means for checking whether the packet is normal by receiving the packet from the two input ports;

packet judgement means for judging the object node of the packet selected by the packet select means, and transmitting the packet to a host connection port or to an output port;

the host connection port for transmitting the packet to the host after receiving the packet from the packet judgement means; and the output port for receiving the packet from the packet judgement means and transmitting the packet to the first output line of the two output lines.

4. The packet processing method according to claim 3, wherein the packet select means checks the first input line connected to the input port of the two input ports and judges whether the first input line is normal, when the first input line connected to the adjacent node is judged normal, receives the packet from the first input line, and when the first input line is judged abnormal checks the other input line connected to the node next to the adjacent node, and receives the packet from the other input line when the other input line is judged normal.

5. The packet processing method according to claim 3, wherein packet judgement means checks the object node of the packet transmitted by the packet select means, such that when the object node of the packet is the node, the packet is transmitted to the host connection portion, when the object node of the packet is not the node but the adjacent node, the packet is disused, and when the object node of the packet is neither the node nor the adjacent node, the packet is transmitted to the output port.

\* \* \* \* \*